United States Patent [19]

Ros

[11] 3,960,167
[45] June 1, 1976

[54] GAS COCK

[75] Inventor: Bonifacio Echavarri Ros, Cordovilla (Pamplona), Spain

[73] Assignee: Orbaiceta, S.A., Spain

[22] Filed: June 7, 1974

[21] Appl. No.: 477,357

[30] Foreign Application Priority Data

June 8, 1973 Spain .................................. 415709

[52] U.S. Cl. .......................... 137/375; 137/625.47
[51] Int. Cl.² .................................. F16K 11/085
[58] Field of Search .......... 137/375, 625.41, 625.47, 137/636.2; 251/309–312

[56] References Cited
UNITED STATES PATENTS

| | | | |
|---|---|---|---|
| 2,621,886 | 12/1952 | Mueller | 137/625.47 |
| 3,532,123 | 10/1970 | Anthony | 137/636.2 |

*Primary Examiner*—Henry T. Klinksiek
*Attorney, Agent, or Firm*—Robert E. Burns; Emmanuel J. Lobato; Bruce L. Adams

[57] ABSTRACT

A gas cock having a valve body having an axial bore within which is housed a plug rotationally mounted therein for opening and closing the gas cock. The valve body has an inlet passageway and an outlet in communication with the bore. An elastic sleeve is disposed within the bore and circumferentially of a part of the plug body that open sand closes the inlet passageway communication with the bore of the valve body thereby to control gas flow. The sleeve has a fluid-tight seal between it and the bore and between it and the plug portion extending axially therein. The sleeve provided with lateral opening disposed between the two ends thereof in registry with the inlet passageway to establish communication to the inlet passageway. The lateral opening is defined by a lateral annular extension that fits into the inlet passageway precluding axial and rotational movement of the sleeve to the bore. The sleeve is preferably provided with inner circumferentially spaced axial ribs and annular inner ribs on the ends effecting a seal with the part of the plug portion within the sleeve.

4 Claims, 12 Drawing Figures

GAS COCK

BACKGROUND OF THE INVENTION

The present invention relates to a new gas cock.

Cocks at present on the market consist of a plug or taper-stemmed obturator with several holes or orifices in its body and a main shell in which the aforesaid plug is accurately fitted.

This plug is thrust by a spring which tends to insert it in the main shell housing or valve body in order to absorb wear which might be caused with use.

The details mentioned are lubricated with a special grease which also seals the plug with the shell.

The cocks in question had the following faults:

In the event of loss of grease, leaks develop due to lack of tightness and microweld faults, the cock eventually becoming useless.

As a consequence of the fit and temperature, the cone seizes when hot, preventing operation to select burners or intakes.

Together with friction, another consequence of fit is the need for a low-friction factor material, at present the practice is to use brass or bronze, which are expensive materials, significantly increasing production cost.

Similarly increasing production cost is the extreme machining accuracy of the plug and socket needed to ensure tightness.

SUMMARY OF THE INVENTION

Tightness of the cock accordingly to the invention is ensured by means of one or several elastic joints or gaskets, preferably an elastic strip allowing a sufficiently large amount of play between the plug and main shell.

Special greases are therefore not required, and even if this grease is lost, this causes neither leaks nor microwelds.

In addition, plug play averts the cost of accurate machining and does not require low friction-factor material, so that cheaper materials can be used.

To obtain these advantages, a cylindrical plug or obturator has been fitted in a suitable housing in the main shell or valve body, the plug and shell having a number of axial and/or transverse orifices for entry and outlet of the fluid medium.

This main shell or valve body has an internal undercut or offset in which is fitted with a certain degree of pressure the aforementioned elastic strip, placing the plug or obturator in question inside it (the strip). As the strip presses lightly on the plug this ensures tightness of the passages between plug and main shell, making an accurate fit between the two pieces unnecessary.

The elastic strip may have one or several holes which, by fitting, will match those in the cock shell for the flow of gas. Thus, as the strip seals the plug there is no flow of the fluid medium through the cock unless some plug orifice is fully or partially aligned with another orifice in the main shell. This allows us to obtain passage to the various burners or for the several intakes of a single burner.

If this strip miscarries in use, it will block the passage of gas and inclusively could succeed in cutting it off inasmuch as it would close the orifices in the main shell where the flowing medium enters. This is unlikely to happen inasmuch as it has a larger friction surface area on its outer face with the cock-shell than on the inner face with the plug, this being the only detail which could displace the strip when turning it in order to locate the various outlet positions.

However, in order to obtain greater safety so that the strip will stay permanently in its correct position at all or at least at some of its orifices, an annular outer boss has been fitted around its perimeter, this boss being locked in the cock-shell passages or orifices, consequently increasing grip between strip and shell.

For the same reason and in order to lessen friction between strip and plug without detriment to the need for tightness, this strip is fitted on the inside with at least two radial ribs at its ends and several longitudinal, helical, etc. ribs in the rest. These ribs significantly lessen friction contact with the plug, which can thus turn freely inside the strip.

BRIEF DESCRIPTION OF THE DRAWINGS

In order better to understand the nature of the invention, we offer a schematic diagram in the enclosed drawing, this being absolutely unrestrictive and therefore subject to accessory modifications not altering the essential characteristics.

Figure 1:
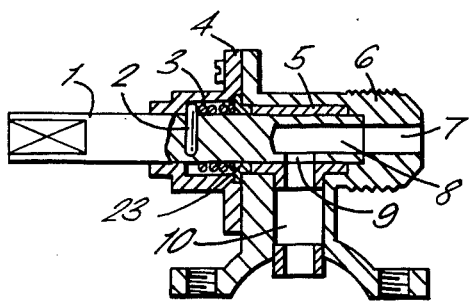
FIG. 1 is a longitudinal section of a cock with a longitudinal passage and another cross-passage for gas flow. In it is shown the elastic strip sealing the passages in question in respect of the plug orifices, set inside the aforesaid strip, according to the invention.

The following particulars are noted in these:
1. Plug or obturator
2. Retainer and positioning pin
3. Spring
4. Housing and positioning shell
5. Elastic strip
6. Cock housing
7 & 10. Shell passages 6 for fluid flow
8. Coaxial plug orifice 1
9. Transverse plug orifice 1
11. Radial strip-end ribs 5
12. Longitudinal strip ribs 5
13. Transverse strip orifice 5
14. Annular peripheral plug boss 13
15. Control spindle
16. Fluid-medium outlet passages.
17. Automatic feed control seat-valve.
18. Electromagnet.
19. Manual-feed operating stem
20. Plug inner shell or wall 1
21. Toric or toroidal gasket
22. Plug notching 1
23. Shell-sleeve

DESCRIPTION OF THE PREFERRED EMBODIMENTS

As shown in FIG. 1, a cock housing or valve body 6 has an axial orifice extending into a passage 7 and communicating with a transverse passage 10 so that the gas enters through one of the passages and leaves by the other.

Figure 2:
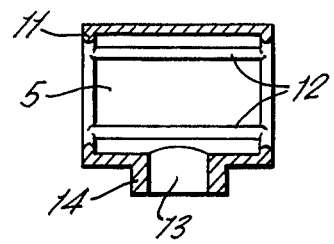
FIGS. 2 & 3 are sections of the strip, illustrating the ribs with which can be fitted to decrease friction surface with the distributor or valve.
Figure 3:
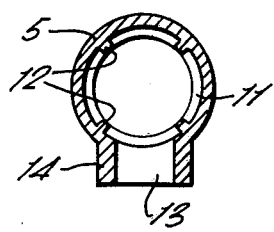

In the aforesaid coaxial housing orifice is disposed a pressure-set elastic strip made as an elastic sleeve 5, in which the transverse orifice or lateral opening 13 has been made — see FIGS. 2 & 3. When the strip 5 is fitted, this orifice 13 stays facing the shell cross-passage 10 so that it does not impede fluid-medium flow.

Due to the pressure with which the strip 5 is fitted, it offers the greatest surface area on its outer face, this resulting in friction purchase with the housing 6 which tends to hold the strip 5 in its correct position.

However, to prevent strip 5 miscarriage due to unforeseen causes, the annular boss 14 has been provided around its orifice 13, this locking in the housing 6 passage 10 — see FIG. 1 — playing a part similar to a stop-piece for any axial or rotational movement the strip 5 might have.

Inside this strip 5 is fitted the plug which in this type of cock may consist of the control shaft itself. This plug 1 has interlinking coaxial 8 and transverse 9 orifices — see FIGS. 4, 5 & 6 — made in such a way that the coaxial orifice 8 is always aligned — see FIG. 1 — with the housing 6 passage 7 and the other orifice can be aligned at will fully or partially with the orifice 13 of the strip 5 by turning the plug 1.

When all these orifices and passages are fully or partially aligned, the fluid medium enters for example through passage 10 — see FIG. 1 — passing through the strip 5 and plug 1 orifices, leaving by housing 6 passage 7.

When plug 1 orifice 9 is not aligned, the fluid medium should not be able to filter through the cock, for which it is necesary that there are no internal interstices. The strip 5 is therefore pressed between the housing 6 and plug 1.

Now then, when turning plug 1 to bring about and/or regulate passage of the fluid medium, friction is created between it and the strip 5; due to the inner surface of the — strip 5 being less than the outer or friction area of the housing 6, this friction will be incapable of dragging and displacing the strip in its travel, having in addition to consider the effect the boss 14 has on this — See FIGS. 2 & 3.

Nevertheless, for greater security, it is possible to increase the friction surface area of strip 5 with the plug 1. This effect is obtained by fitting the inner face of the strip 5 with radial ribs 11 — see FIGS. 2 & 3 — at the ends, preventing the fluid-medium flow from leaking over the outer surface area of the plug 1. It has likewise been fitted with longitudinal ribs 12 — see FIGS. 2 & 3 — which may be helical, etc., their role consisting of preventing the fluid medium leaving through the passages unless plug 1 orifice 9 is aligned.

In harmony with this, the plug 1 hitches with the strip 5 on the surface area with the aforesaid ribs, this being much less than the inner surface area of the strip 5, so that it becomes impossible for it to be dragged while turning.

The plug 1 is fitted with the pin 2 in its housing — see FIG. 1 — this coming into contact under spring 3 pressure with the bottom of the shell 4, keeping all the member parts when integral with cock housing 6. The housing 4 in question has a number of notches at the bottom, on which the pin 2 latches, so establishing the shutoff positions and those of the various drain-offs or outlets.

Figure 4:
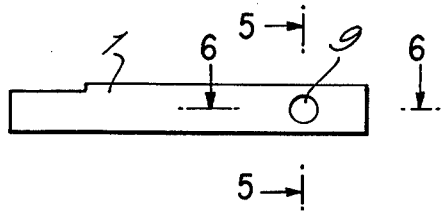
FIGS. 4, 5 & 6 are respectively views of the plug and two sections shown in the first, depicting to us the structure of the plug in question with its intercommunicating orifices for flow of the fluid medium.
Figure 5:
Figure 6:
Figure 8:
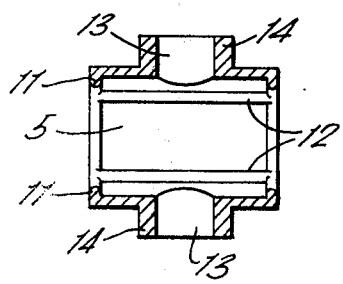
FIGS. 8 & 9 pertain to sections of the strip, illustrating the ribs which can be provided on it to decrease friction purchase with the distributor or valve.
Figure 9:
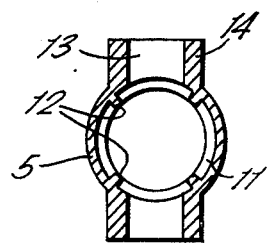

For the type of cock shown in FIG. 4, meaning a cock with several gas outlet passages 16, the elastic strip 5 will have several orifices 13 — see FIGS. 5 & 6 — with their corresponding external annular bosses 14, which will be locked in the output passages 16, holding it (the strip) in its correct position. This strip 5 may similarly be fitted with the ribs 11 & 12 (sic) mentioned, significantly lessening the friction surface area with the plug 1 — see FIG. 7.

Figure 10:
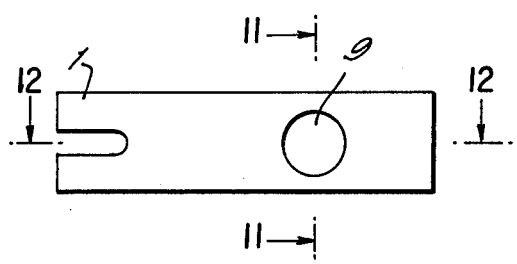
FIGS. 10, 11 & 12 pertain to a view of the plug and the sections indicated in it, showing its structure, with the various orifices and notching or gap giving it serviceable form.
Figure 11:
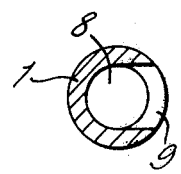
Figure 12:
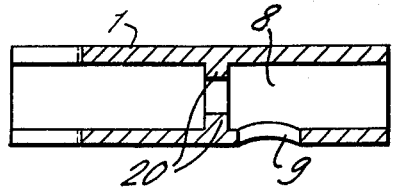

In this particular case, in which the seatvalve 17 is controlled by the electromagnet 18 when the appliance is in the normal condition, the plug 1 is a hollow cylinder — see FIGS. 10, 11 & 12 — with its shell 20 drilled — see FIG. 12 — in its middle area, the stem 19, which extends to the control spindle 15, runs through the shell 20 in question. When thrusting on the control spindle 15, the stem 19 opens the valve 17 (sic), allowing passage of the fluid medium until the electromagnet 18 can operate.

Figure 7:
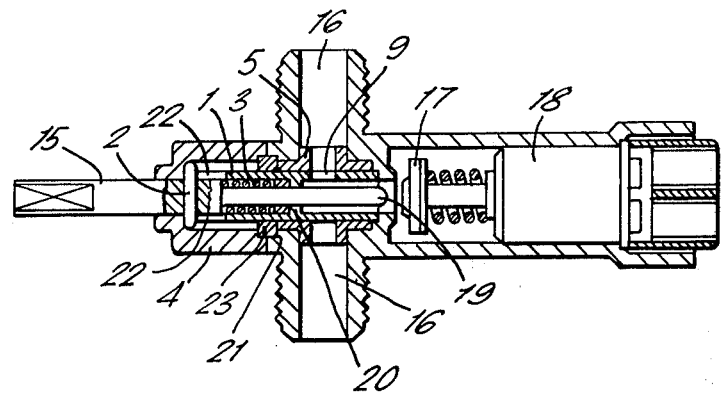
FIG. 7 is another longitudinal section of a cock with several outlet passages and an electrovalve to control the feed. In it is shown the elastic strip appropriately shaped for this type of cock.

As the fluid medium could leak through interstices between shell 20 and stem 19 a toric or toroidal gasket 21 is fitted to prevent this — see FIG. 7 — this being pressed between plug 1, the stem 19 and the spring 3, which in turn thrusts spindle 15. By spring 3 action, the spindle 15 returns to its position when ceasing to thrust to open valve 17 (sic), remaining held in the cock by pin 2 acting as a stop-buffer in the housing shell 4.

Pin 2 is also locked by spring 3 in a number of notches in the housing shell bottom 4; these notches allow the operator to determine consumption and open up to one or other burner. In addition, pin 2 is permanently engaged in plug 1 notches 22 (sic), so furnishing the turning movement needed for the various positions to be adopted.

Finally, so that the plug 1 only has turning motion within the strip 5 — see FIGS. 1 & 7 — the plug 1 has been fitted at one end in the cock housing 6 and in the middle area on the shell-sleeve 23, both acting as ball bearings.

The nature of the invention sufficiently described, as also its industrial implementation, it remains only to add that it is possible to introduce changes in its form, material and arrangement in its assembly and component parts, while such alterations do not take substance from it fundamentals.

I claim:

1. A fluid cock comprising, a valve body having an inlet passageway, an outlet and an axial bore in communication with said inlet passage and said outlet, a plug having an axial portion rotational in said bore for allowing fluid flow from said inlet to said outlet and for closing off the fluid flow, a single elastic inner sleeve solely in said bore circumferentially of a part of said axial portion of said plug in said bore controlling said fluid flow, said valve body having an undercut in said bore within which said sleeve is housed, said sleeve providing a fluid-tight seal between said bore and said sleeve without bonding thereto and between said portion of said plug and the interior of said sleeve, said sleeve extending transversely of said inlet passage, said sleeve having a lateral opening disposed in registry with said inlet passageway for allowing fluid flow through said opening under control of said part of said portion of said plug therein, and a lateral, annular boss on said sleeve intermediate opposite ends of said sleeve defining said lateral opening extending axially into said inlet passageway.

2. A fluid cock according to claim 1, in which said elastic sleeve comprises internal annular ribs adjacent opposite ends thereof defining a seal with said part of said portion of said plug in said elastic sleeve.

3. A fluid cock according to claim 2, in which said elastic sleeve comprises internal circumferentially spaced axial ribs in fluid-tight contact with said part of said part of said portion of said plug in said elastic sleeve.

4. A fluid cock according to claim 1, in which said sleeve comprises a second lateral opening intemediate opposite ends of the sleeve and a second lateral annular boss on a side of said elastic sleeve opposite to a side on which the first-mentioned lateral opening is disposed, said valve body having another passageway into which said second annular boss extends.

* * * * *